G. E. BRITTAIN.

HOLDER FOR CEMENTING SOLES.

APPLICATION FILED NOV. 21, 1912.

Reissued Apr. 21, 1914.

13,714.

Witnesses:
H. B. Davis.
C. Doyle.

Inventor:
Geo. E. Brittain
by Poyrot & Hamilton
Atty's

UNITED STATES PATENT OFFICE.

GEORGE E. BRITTAIN, OF HAVERHILL, MASSACHUSETTS, ASSIGNOR TO IRVING L. KEITH, OF HAVERHILL, MASSACHUSETTS.

HOLDER FOR CEMENTING SOLES.

13,714. Specification of Reissued Letters Patent. Reissued Apr. 21, 1914.

Original No. 1,016,544, dated February 6, 1912, Serial No. 657,466. Application for reissue filed November 21, 1912. Serial No. 732,797.

*To all whom it may concern:*

Be it known that I, GEORGE E. BRITTAIN, a citizen of the United States, residing at Haverhill, in the county of Essex and State of Massachusetts, have invented an Improvement in Holders for Cementing Soles, of which the following is a specification.

In the manufacture of certain kinds of shoes, particularly some kinds of McKay sewed shoes, it is customary to cement a tap-piece, having a skived shank end, to the inner side of an outer sole, so that the two parts will be held in position while they are stitched. In performing this cementing operation it has been customary to place cement between the two pieces which are to be cemented together, then place them in piles in a press, and press the pieces together, so that they will adhere. As a matter of convenience, the cementing operation is usually performed at some distance from the press, so that the piles of soles must be transferred thereto, and they are liable to be misplaced while this is being done. Further difficulty is encountered on account of the fact that the cemented surfaces are not held in contact until after they are forced together in the press, so that the cement becomes dry before such parts are pressed together to cause them to adhere. Much inconvenience and difficulty is experienced in making the skived shank end adhere, on this account, and it is particularly necessary that this portion be firmly cemented to the sole.

The object of my invention is to provide means for holding the sole parts in stacks, as they are cemented, so that they may be transferred to the press, without danger that they will be misplaced, so that the operation of handling may be greatly facilitated, and further to provide a convenient means for holding the cemented surfaces, and particularly the skived shank ends, in contact so that all portions will be firmly cemented together.

Figure 1:
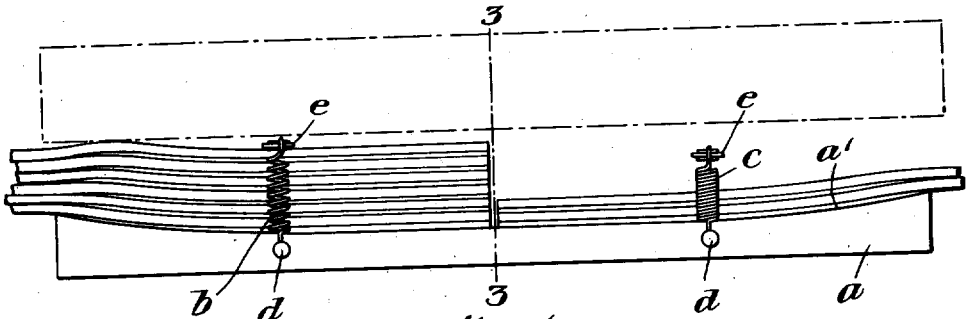
Figure 2:
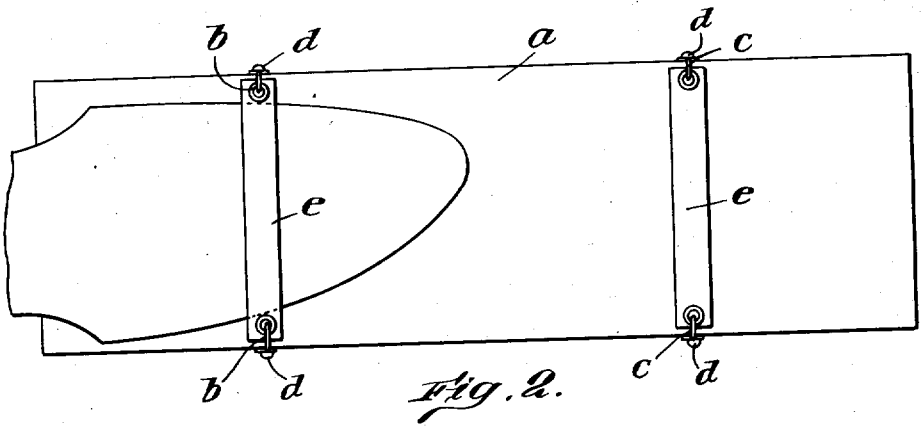
Figure 3:
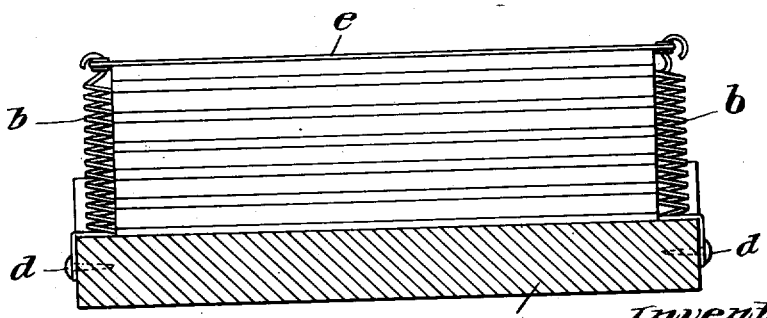

I accomplish these objects by the means shown in the accompanying drawing, in which, Figure 1 is a side elevation, and Fig. 2 is a plan view of a holder made according to my invention. Fig. 3 is an enlarged sectional view on line 3—3, of Fig. 1.

According to my invention I provide a holder, which comprises a base plate *a*, preferably of wood, which is adapted to bend slightly under pressure, and having a sole supporting face *a'* on its upper side, said face having its end portions concaved, or upwardly curved from a horizontally disposed, intermediate, middle-portion to the ends. The particular extent of the upward curvature depends somewhat on the thickness of the soles, which are to be placed in the holder, and length of the scarf on the tap, but usually the curvature is preferably approximately as shown.

A pair of coiled springs *b* are attached to the longitudinal sides of the plate *a*, at a point approximately midway between the middle transverse line thereof, and one end, and a second pair *c* are correspondingly attached between said line and the opposite end, said springs being attached by pins *d*, so that the end of each spring rests on the face *a*, and is thus caused to be held in upright position, as shown. Canvas straps *e* are respectively connected to the ends of each pair of springs, disposed at opposite sides of the base plate, so that said straps extend transversely thereon, said springs having hooked end-portions passing through eyelets in said straps, so that said straps may be readily detached therefrom at one or both ends.

The method of using the apparatus is as follows: The straps *e* are disconnected at one end from their respective springs, the latter being held firmly in upright position by their own strength. The cement is applied to the surface of a tap-piece, or a sole-piece, and the two are placed together, so that the edges coincide. The two pieces are then placed on the base-plate *a*, so that the toe ends thereof, in case the sole is of the largest size, extend nearly to the middle of the base-plate, and the skived portion of the tap-piece extends adjacent one end thereof, the heel portion of the sole overhanging beyond the end, and other cemented soles and taps are placed thereon in a stack. Cemented soles and tap-pieces are likewise stacked on the opposite end portion of the base-plate, as shown in Fig. 1, the "rights" being placed on one end portion of the base, and the "lefts" on the other, and the two stacks thus being placed toe to toe. If the soles are smaller than the largest sole which the holder is adapted to receive, the skived end of the tap will be held at a greater distance from the end of the plate *a* than that shown, the soles being preferably placed so that the middle portion of the forepart is opposite the corresponding springs. When a sufficient number of soles have been thus placed on the base, the straps *e* will be drawn over the top of the respective stacks and fastened, and, in doing this, the springs will be stretched so that the straps will be drawn down onto the soles which will be depressed sufficiently to hold the surface together and prevent the cement from drying.

As the springs are held in upright position they will assist materially in holding the soles in position while they are being stacked, and, after the canvas straps have been fastened over the soles, they will also securely hold the soles in place while the holder is being transferred to a press. A plurality of holders thus filled are then placed, one on the other, in a press and all the soles on each holder are compressed at one time.

While the surface of the upper soles of each stack will not be level before they are compressed, the compression of the higher portions will be sufficient to permit compression of the lower portions, so that all parts of the tap-pieces will be placed under some pressure, as indicated in Fig. 1, which will be sufficient to cause the cemented portions to adhere. The base-plates are also adapted to bend somewhat to conform to conditions.

The degree of upward inclination, or curvature may be varied somewhat according to conditions, such as the length of the skived portion on the tap and thickness of the sole, the extent being sufficient to cause all the skived portions of the taps in the stack to be pressed against the sole, so that this portion of the tap is firmly cemented. By having the face *a'* formed on a gradual upward curve, from a point adjacent the springs to the end of the base, soles of different lengths may be cemented on the same holder, as the upwardly curved face will hold the skived portions against the soles in any position in which the strap is drawn over the middle portion of the sole foreparts. In case the device was to be used to cement whole soles the upwardly curved face would, obviously, not be necessary.

An important advantage of the concave or upwardly curved face of the base, over a flat inclined face, is in that the sharp angle which would necessarily be formed between the two faces would mark the bottom sole to such an extent as to deface it. This is, however, avoided with the construction shown and no special care needs to be observed as to the exact position in which a sole shall be placed thereon. As the straps *e* are of textile material and relatively thin, as compared with the soles, they will not interfere with the compressing operation, and they may be readily disconnected when the stacks are removed from the press.

From the foregoing description it will be observed that the upwardly inclined portions of the base-plate perform an important function, both before and after the plate is placed in the press; that is, they hold the skived ends of the taps in close proximity to the soles before the plate is placed in the press, so that evaporation of the fresh cement is prevented to a considerable extent, and then force the skived ends firmly against the soles after they are placed in the press. The springs and straps also have two functions:—viz:—to hold the stack against the supporting face of the block, so that the skived ends, as well as the main portions of the taps, will be pressed against the soles, and evaporation of the cement therebetween will be largely prevented; and to hold the stack in position on the base-plate while it is being transferred to the press, the straps being so arranged that they do not interfere with the pressing operation and therefore do not have to be removed until the pressing operation has been finished.

I claim:—

1. A holder for cemented soles comprising a base-plate having a sole-supporting face, a pair of coiled springs mounted at opposite sides of said face and held by their resilience, in vertical position to form horizontal guiding and holding devices for the soles, and a strap connected to the free ends of said springs, substantially as described.

2. A holder for a stack of alternately arranged, cemented soles and skived taps, comprising a base plate having a supporting face composed of a horizontally disposed sole-forepart receiving portion and a concave end-portion extending upwardly therefrom toward the end of the plate to hold the skived end-portion of each tap against the adjacent portion of the corresponding sole, in combination with pressing means arranged approximately parallel to said forepart portion, to apply pressure to the top of the stack, whereby the taps are held, throughout their entire lengths, in close contact with the soles, substantially as described.

3. A holder for a stack of alternately arranged, cemented soles and skived taps, comprising a base plate having a supporting face composed of a horizontally disposed sole-forepart receiving portion and an inclined portion extending upwardly therefrom, to hold the skived portions of the taps against the adjacent portions of the soles, in combination with pressing means arranged approximately parallel to said forepart portion, to apply pressure to the top of the stack and to hold the taps and soles in contact throughout the length of the taps, substantially as described.

4. A holder for two stacks of alternately arranged cemented soles and skived taps, comprising a base plate having a supporting face composed of horizontally disposed intermediate sole-fore-part supporting portions and concave end-portions extending upwardly from the outermost ends of said fore-part supporting portions to the opposite ends of the plate, to hold the skived end-portions of the taps against the adjacent portions of the corresponding soles, in combination with pressing means arranged approximately parallel to said fore-part portions to apply pressure to the tops of the stacks, and hold the taps, throughout their entire lengths, in contact with the soles to which they are cemented, substantially as described.

5. A holder for two stacks of alternately arranged cemented soles and skived taps, comprising a base plate having a supporting face composed of horizontally disposed intermediate sole-fore-part supporting portions and inclined end-portions extending upwardly from the outermost ends of said fore-part supporting portions to the opposite ends of the plate, to hold the skived end-portions of the taps against the adjacent portions of the corresponding soles, in combination with pressing means arranged approximately parallel to said fore-part portions to apply pressure to the tops of the stacks, and hold the taps, throughout their entire lengths, in contact with the soles to which they are cemented, substantially as described.

6. A holder for cemented soles and skived taps, comprising a base-plate having a sole-supporting face thereon, said face having a horizontally disposed portion and an upwardly inclined portion leading from said horizontally disposed portion to the end of the plate, and a yielding clamping means at opposite sides of said face and extending thereover, for pressing a stack of soles onto said face, substantially as described.

7. A holder for cemented soles and skived taps comprising a base-plate having a concave sole-supporting face extending upwardly toward the end thereof, a pair of vertically extending, longitudinally extensible springs mounted on said plate at opposite sides of the middle portion of said face and a strap for connecting the free ends of said springs, substantially as described.

In testimony whereof I have signed my name to this specification, in the presence of two subscribing witnesses.

GEORGE E. BRITTAIN.

Witnesses:
HENRY S. SLOAN,
C. N. ZIMMERMAN.

Copies of this patent may be obtained for five cents each, by addressing the "Commissioner of Patents, Washington, D. C."